Feb. 7, 1939.  H. L. ROBERTS  2,146,316
DISPENSING DEVICE
Filed Dec. 4, 1937  2 Sheets-Sheet 1
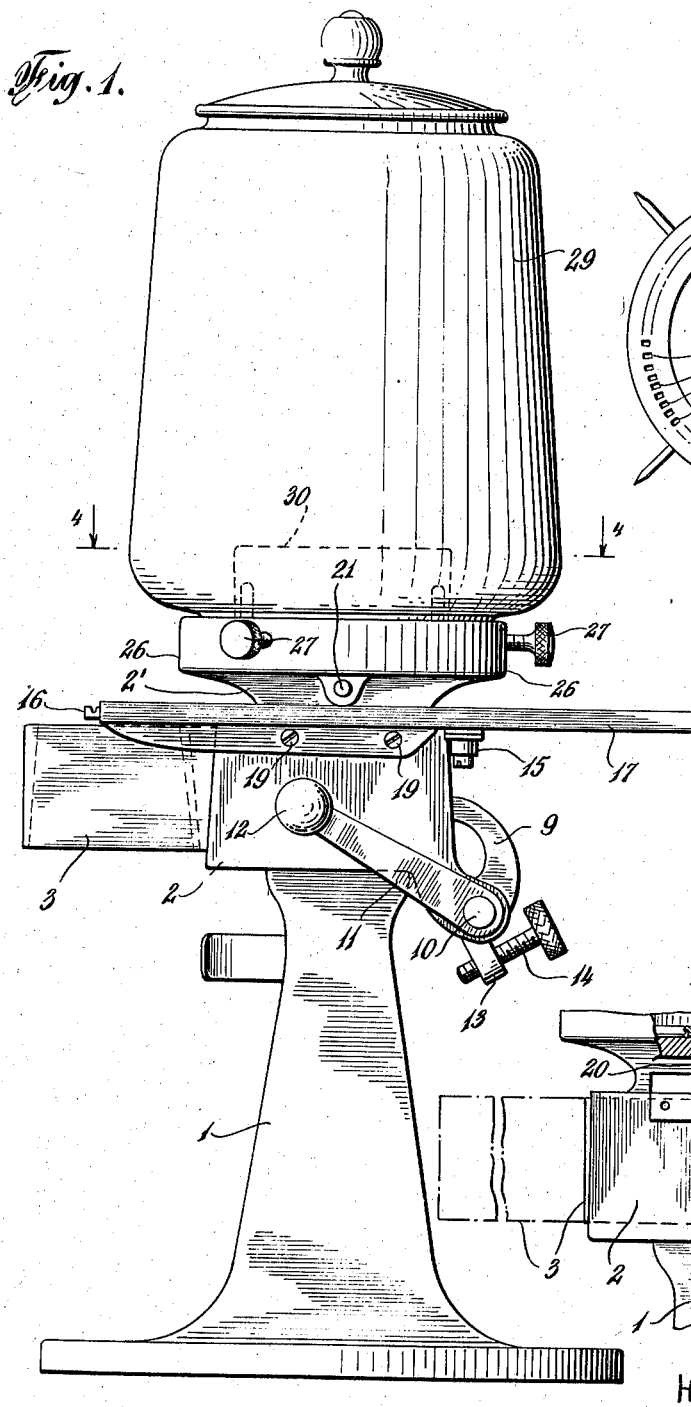
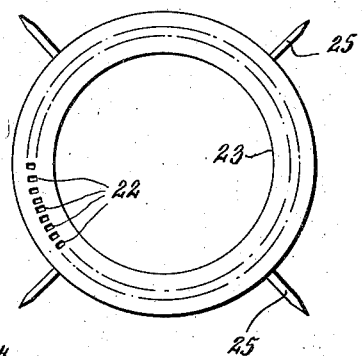
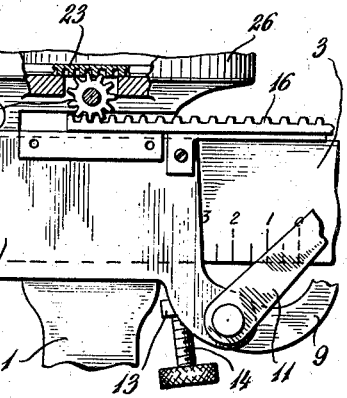
INVENTOR
HORACE L. ROBERTS
BY
*Edward W. Vaill*
HIS ATTORNEY Feb. 7, 1939.   H. L. ROBERTS   2,146,316
DISPENSING DEVICE
Filed Dec. 4, 1937   2 Sheets-Sheet 2
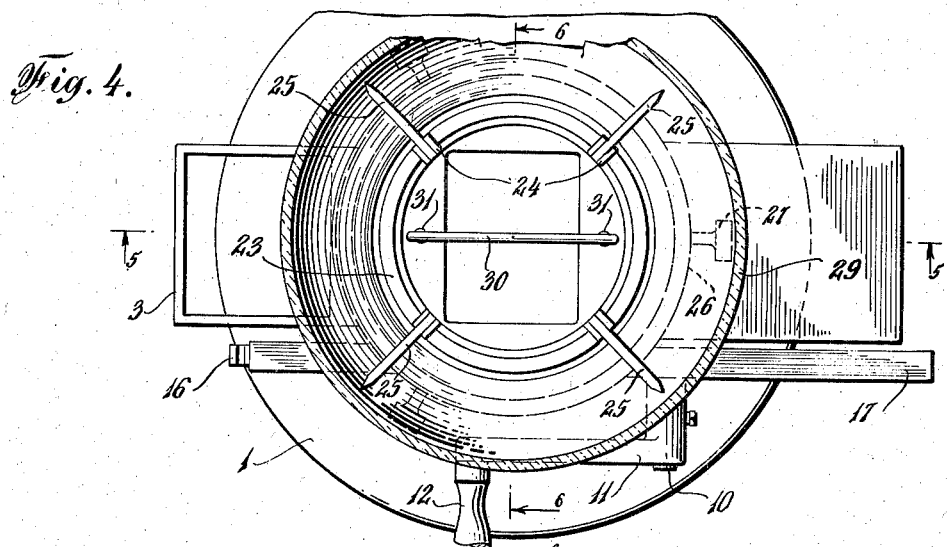
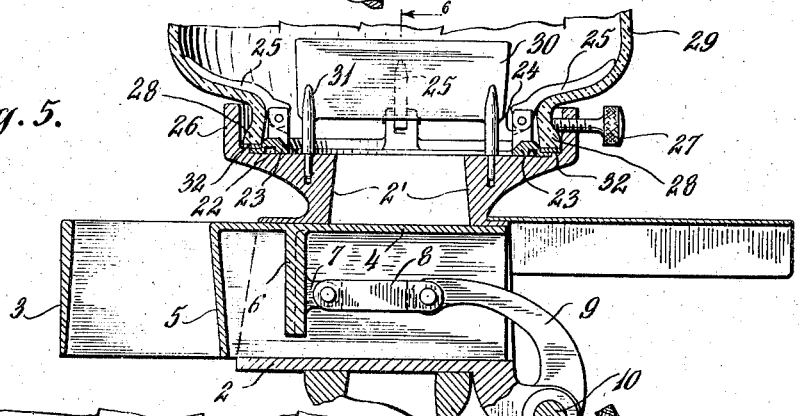
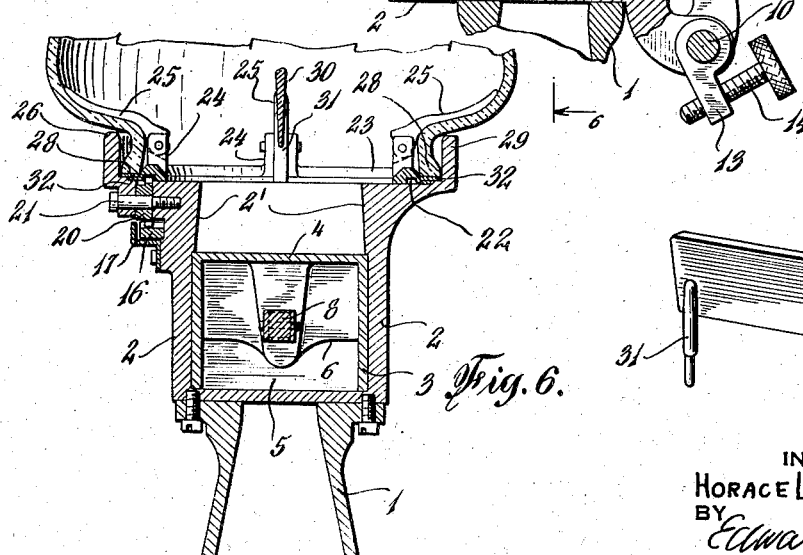
INVENTOR
Horace L. Roberts
BY
Edward W. Vaill
HIS ATTORNEY Patented Feb. 7, 1939

2,146,316

UNITED STATES PATENT OFFICE 2,146,316

DISPENSING DEVICE

Horace L. Roberts, Yonkers, N. Y.

Application December 4, 1937, Serial No. 178,024

5 Claims. (Cl. 221—104)

This invention relates to devices for measuring and dispensing granular materials, such as ground coffee, tea, cereals, sugar, flour or other granular materials of which a consumer or purveyor requires definite measured quantities from time to time in order to make or brew beverages, cooked or uncooked food or ingredients thereof, or for other purposes.

My invention is particularly useful in measuring finely ground coffee for use in apparatus for making "drip coffee", percolated coffee or for making similar beverages from dry granular ingredients.

It has been found that when certain vegetable products, such as coffee, have been ground to fine or powdered conditions, a mechanical measuring thereof becomes very difficult, if not impossible, on account of the tendency of such material to bridge or form arches over openings or passages through which it is desired to have it pass in order to obtain accurately measured quantities thereof.

My invention is particularly designed to overcome such difficulties and enables definite measured quantities of finely ground materials to be obtained without special manipulations of the device and without complicated or expensive apparatus to bring about the desired result.

As an example of one form of my improved dispensing device, reference may be had to the accompanying drawings and to the following detailed description, wherein Fig. 1 of the drawings illustrates a side elevation of one of my improved devices.

Fig. 2 is a plan view of the lower side or bottom of the stirring or agitating member removed from the dispenser.

Fig. 3 is a vertical side view partly in section, showing the means for rotating the stirring or agitating member;

Fig. 4 is a plan view, partly in section on the line 4—4 of Fig. 1;

Fig. 5 is a vertical sectional view taken substantially on the line 5—5 of Fig. 4 but showing the agitating member rotated about 45° from the position shown in Fig. 4;

Fig. 6 is a vertical sectional view taken on the line 6—6 of Fig. 5, but also showing the agitating member rotated about 45° from the position shown in Fig. 4; and Fig. 7 is a perspective view of a removable fixed member around which the agitating member rotates.

Referring to the drawings, the numeral 1 indicates a suitable standard or supporting member that may be shaped to accommodate various locations of the device where it may be desired to use it. The numeral 2 indicates a housing that is mounted on the standard 1 and is adapted to carry slidably therein, a drawer or measuring member 3. The latter, at one end, is open at the top and bottom as shown in Fig. 5, and at the other end and central portion is provided with a top or upper wall 4 which connects with a vertical wall or partition 5 and with a vertical transverse member 6, that carries a lug 7, to which is pivoted a link 8. The link 8 is pivoted at its other end on a crank arm 9 that is fixed to a horizontal shaft 10. The shaft 10 is rotated and oscillated by a crank arm 11 that is provided with a handle 12. 13 indicates a lug that is fixed on the shaft 10 and is provided with an adjustable screw 14, having a knurled head, which screw determines the extent of horizontal travel of the measuring member 3.

As indicated by the attachment at 15, the measuring member 3 carries a rack member 16, provided with gear or rack teeth on its upper surface. Said rack member is preferably covered with a suitable shield as indicated at 17 and the same may be attached to the housing 2 by machine screws 19 or otherwise as may be preferred.

The rack 16 engages a gear pinion 20, that rotates on a suitable axle such as the pin or screw 21 that engages the upper part 2' of the housing 2. The teeth of the pinion 20 also engage recesses or holes 22, forming teeth, in a rotatable ring 23 that rests in a shallow circular recess in the top of the upper part 2' of the housing 2. The ring 23 is provided with several upright supports 24, (in this case four) to which are pivoted the stirring or agitating tongues 25 that are adapted to swing outward and rest on the inner surface of the container for the granular material, hereinafter to be described.

The outer shape of the upper end 2' of the housing 2 is preferably circular and is provided with a cylindrical flange 26 through which pass retaining screws 27.

The retaining screws 27 are adapted to engage the lower flanged or beaded end 28 of the container 29 for the granular material. The container 29 is preferably of glass to permit inspection of the contents and is made with divergent walls that are tapering so that it is smaller at its upper diameters than at its lower diameters as indicated in Fig. 1.

The purpose of the tapering construction is to prevent bridging, arching over, or compacting of the granular material contained therein, as referred to in the introduction to this description. This condition I have carried out uniformly throughout the construction and design of various parts of my improved dispensing device, and in that respect, it differs materially over practically all similar devices that have been designed to contain and measure ground granular materials.

Referring to Figs. 1, 5 and 7, it will be noted that I have provided a central stationary but removable member that is supported on two legs or pins which enter holes in the upper portion 21 of the housing 2. This is to aid the breaking up and agitation of the granular contents of the container 29 by the rotating motions of the tongues 25.

In Figs. 5 and 6, I have illustrated the lower flange 28 of the container 29 as being provided with a gasket or resilient washer 32 that rests upon a small circular ledge or flange that is a little higher than the outer edge of the rotatable ring 23. That construction enables the weight of the container 29 and its contents to hold the ring 23 seated in its shallow recess but permits it to rotate when turned by the pinion 20.

Although the operation of my improved dispensing device may be obvious from the above description, it will now be briefly set forth. When the measuring member or drawer 3 is in the position shown in Figs. 1 and 5, the granular material will rest on the top 4 thereof, having run downward from the container 29. The crank arm 11 is then rotated in a clockwise direction to slide the drawer 3 toward the right. When the partition 5 has passed below the opening in the upper part 2' of the housing (Fig. 3) the space between the vertical parts 3 and 5 will be filled with coffee or other granular material that is retained therein by the bottom of the housing 2.

The crank arm 11 is then rotated in an anti-clockwise direction to its original position (Fig. 1) and the material will be discharged and drop downward from the drawer 3 into any suitable receptacle that may be placed below it. The coffee or granular material may then be conveyed to a coffee pot percolator or drip-coffee device such as a so called, "Silex", coffee making device.

It will be noted that when the crank arm 11 is rotated toward the right or left, the rack 16 will be carried with the drawer 3 and will rotate the pinion 20 so that it will oscillate the ring 23 and the tongues 25 within and upon the inner surface of the container 29. That motion serves to loosen or break up the arching or compacting of the granular material so that it may easily fall or run into the upper part 2' of the housing and into the measuring device or drawer 3 when in position.

In the example of the device as shown and described, I have provided the volume of the space between the end of the drawer 3 and the partition 5 so that it will hold about 3 ounces of ground coffee when entirely full. That is substantially the correct amount of coffee to make eight cups of liquid coffee in a Silex or other device for making drip coffee.

In case lesser amounts of coffee or other granular material should be required, the adjusting screw 14 may be set so that the drawer or measuring member 3 will not be moved so far into the housing 2.

In Fig. 3, I have shown the side of the drawer 3 graduated so as to indicate the extent of movement thereof when 1 ounce, 2 ounces or fractions thereof are required. The motion of the drawer 3 toward the right may be limited by adjustment of the screw 14 to stop said motion on or adjacent any of the graduations or scale markings on the drawer 3. Thus quantities other than the full capacity of the drawer 3 may be measured and discharged into a suitable receptacle.

Having described this form of my invention, I do not wish to be understood as being limited to the details of the device as shown and described but it is to be understood that I may change the design thereof so far as is consistent with the scope of the following claims.

What I claim and desire to protect by Letters Patent is:

1. In a dispensing device for fine granular material, having a removable reservoir or container mounted above members for dispensing measured quantities of said material, the improvements that comprise, providing said container with downwardly divergent side walls, one of said members on which said container rests, having a passage of reduced diameter communicating with the outlet of said container, pivoted agitating tongues located above said passage and adapted to extend radially outward toward said walls, and means for rotating said tongues above said passage within said container and parallel with the walls thereof, whereby bridging of said material is prevented and removal of the contents permitted.

2. In a dispensing device for fine granular material, having a movable reservoir or container mounted above members for dispensing measured quantities of said material, the improvements that comprise, providing said container with downwardly divergent side-walls and an outlet at the bottom thereof having a reduced diameter, pivoted agitating tongues located above said outlet and adapted to lie radially on the upper surface of said reduced outlet portion, and means for rotating said tongues within said container, whereby bridging of said material is prevented and removal of the contents permitted.

3. In a dispensing device for fine granular material, having a removable reservoir or container mounted above members for dispensing measured quantities of said material, the improvements that comprise, providing said container with downwardly divergent side-walls, one of said members on which said container rests having a passage of reduced diameter communicating with the outlet of said container, a rotatory ring resting on said member, pivoted radially extending agitating tongues carried on said ring and within said container, and means for rotating said ring, whereby bridging of said material is prevented and removal of the contents permitted.

4. A dispensing device for fine granular material, comprising a container having downwardly divergent side-walls and an opening at its lower end, a horizontally slidable hollow measuring member below the opening in said container, said member having two chambers, one with an open top and bottom at one end and the other with a closed top at the other end, means for moving said measuring member to bring said ends respectively beneath the opening in said container, a housing in which said measuring member is slidable horizontally and having a passage connecting with the opening in said container, means for moving said member in said housing, a gear rack carried on said measuring member, a gear pinion engaging said rack and rotatably mounted on said housing, and engaging said rack, and a rotary ring carrying pivoted agitating devices and resting removably on said housing and having recesses forming a circular rack adapted to engage said pinion and be rotated thereby.

5. A dispensing device for fine granular material, comprising, a container having downwardly divergent side-walls and opening at its lower end, a horizontally slidable measuring member below the opening in said container, a housing in which said measuring member is slidable horizontally and having a passage connecting with the opening in said container that is removably mounted thereon, a gear rack carried on said measuring member, a gear pinion engaging said rack and rotatably mounted on said housing, a rotary ring resting on said housing and having recesses forming a circular rack adapted to engage the teeth on said pinion and be rotated thereby, and pivoted tongues carried by said ring and adapted to move along the inner surface of said container when said ring is rotated.

HORACE L. ROBERTS.